(12) United States Patent
Tanaka et al.

(10) Patent No.: US 9,272,289 B2
(45) Date of Patent: Mar. 1, 2016

(54) METHOD AND MATERIAL FOR INEXPENSIVELY SEPARATING CARBON NANOTUBES, AND SEPARATION VESSEL

(75) Inventors: Takeshi Tanaka, Ibaraki (JP); Hiromichi Kataura, Ibaraki (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 503 days.

(21) Appl. No.: 13/814,322

(22) PCT Filed: Jul. 20, 2011

(86) PCT No.: PCT/JP2011/066436
§ 371 (c)(1),
(2), (4) Date: Apr. 3, 2013

(87) PCT Pub. No.: WO2012/017822
PCT Pub. Date: Feb. 9, 2012

(65) Prior Publication Data
US 2013/0180897 A1    Jul. 18, 2013

(30) Foreign Application Priority Data
Aug. 6, 2010   (JP) .................................. 2010-177895

(51) Int. Cl.
*C01B 31/02*   (2006.01)
*B01D 15/08*   (2006.01)
(Continued)

(52) U.S. Cl.
CPC . *B03B 5/00* (2013.01); *B01D 15/08* (2013.01); *B82Y 30/00* (2013.01); *B82Y 40/00* (2013.01); *C01B 31/0266* (2013.01); *C01B 2202/22* (2013.01)

(58) Field of Classification Search
CPC .......... B01D 15/08; B01D 15/26; B03B 1/00; B03B 5/00; C01B 31/02; C01B 31/0206; C01B 31/0226; C01B 31/026; C01B 31/0233; C01B 31/0266; C01B 31/0273; C01B 31/022; C01B 31/024; C01B 2202/02; B82Y 30/00; B82Y 40/00; Y10S 977/842; Y10S 977/845
USPC ................. 210/263, 511, 541, 600, 660, 679; 423/445, 445 B, 445 R, 447.1–447.3, 423/460, 461; 977/742–754, 842–848; 127/30; 536/3
See application file for complete search history.

(56) References Cited

U.S. PATENT DOCUMENTS 2,200,774 A * 5/1940 Halliday ..................... 264/144
3,458,428 A * 7/1969 Huebner ..................... 204/600
(Continued)

OTHER PUBLICATIONS

Publication by P. Umek et al, "Separation of SWNTs by diffusion", Published in 'Synthetic Metals', vol. 121, pp. 1211-1212, 2001.*
(Continued)

*Primary Examiner* — Joseph Drodge
(74) *Attorney, Agent, or Firm* — Wenderoth, Lind & Ponack, L.L.P.

(57) ABSTRACT

An industrially highly useful CNT separation method is provided whereby metallic CNTs and semiconducting CNTs can be efficiently separated and purified in large quantities in a short time period from CNTs containing these carbon nanotubes, using inexpensive equipment and in simple steps, and whereby metallic CNTs and semiconducting CNTs can be separated at low cost. The CNT separation method includes adding a CNT dispersion to a powder-charged separation vessel to selectively adsorb the semiconducting CNTs to the powder, and eluting the semiconducting CNTs adsorbed to the powder after collecting the metallic CNTs.

8 Claims, 5 Drawing Sheets

(51) Int. Cl.
  *B82Y 40/00* (2011.01)
  *B03B 5/00* (2006.01)
  *B82Y 30/00* (2011.01)

(56) References Cited

U.S. PATENT DOCUMENTS

| | | | |
|---|---|---|---|
| 3,704,217 A * | 11/1972 | Nerenberg | 210/635 |
| 7,682,590 B2 * | 3/2010 | Sakakibara et al. | 423/447.1 |
| 7,785,472 B2 * | 8/2010 | Murakoshi | 210/656 |
| 8,404,207 B2 * | 3/2013 | Takeshi et al. | 423/447.1 |
| 8,454,923 B2 * | 6/2013 | Haddon | 423/447.1 |
| 8,512,668 B2 * | 8/2013 | Tanaka et al. | 423/447.1 |
| 8,697,026 B2 * | 4/2014 | Tanaka et al. | 423/447.1 |
| 8,715,607 B2 * | 5/2014 | Liu et al. | 423/447.2 |
| 8,881,908 B2 * | 11/2014 | Tanaka et al. | 209/2 |
| 2005/0009039 A1 * | 1/2005 | Jagota et al. | 435/6 |
| 2005/0233074 A1 * | 10/2005 | Dalziel et al. | 427/212 |
| 2006/0034935 A1 * | 2/2006 | Pronovost et al. | 424/489 |
| 2010/0111814 A1 * | 5/2010 | Doorn et al. | 423/447.1 |
| 2010/0189626 A1 * | 7/2010 | Tanaka et al. | 423/439 |
| 2011/0042276 A1 * | 2/2011 | Miller | 209/8 |

OTHER PUBLICATIONS

Publication by Takeshi Tanaka et al, "Mass separation of metallic and semiconducting single-wall carbon nanotubes using agarose gel", Published in 'Physica Status Solid', vol. B 246, No. 11-12, pp. 2490-2493, Oct. 19, 2009.*

* cited by examiner

METHOD AND MATERIAL FOR INEXPENSIVELY SEPARATING CARBON NANOTUBES, AND SEPARATION VESSEL

TECHNICAL FIELD

The present invention relates to a method and a material for inexpensively separating metallic carbon nanotubes and semiconducting carbon nanotubes from carbon nanotubes (CNTs) containing these carbon nanotubes. The invention also relates to separation vessels.

BACKGROUND ART

CNTs have excellent electrical characteristics and mechanical strength along with other superior properties, and have been actively researched and developed as an ultimate novel material. CNTs are synthesized by using various methods, including a laser vaporization method, an arc discharge method, and a chemical vapor deposition method (CVD method). However, CNTs produced by using any of the currently available synthesis methods are obtained as a mixture of metallic CNTs and semiconducting CNTs.

Because either one of the metallic and semiconducting properties is often used in actual use, separation and purification of only the metallic or semiconducting CNTs from a CNT mixture is an urgent and important research subject.

There are reports of separating metallic CNTs and semiconducting CNTs. However, all of these reports pose problems in industrial production of metallic CNTs and semiconducting CNTs, as follows. (1) The separation involves complicated steps, and cannot be automated; (2) the separation is time consuming; (3) mass processing is not possible; (4) expensive equipment and chemicals are required; (5) only one of the metallic CNTs and semiconducting CNTs are obtained; and (6) the collection rate is low.

Examples of the currently available methods include a method in which CNTs dispersed with a surfactant are subjected to dielectrophoresis on microelectrodes (Non-Patent Document 1), a method in which amines are used as the dispersant in a solvent (Non-Patent Documents 2 and 3), and a method for selectively burning semiconducting CNTs with hydrogen peroxide (Non-Patent Document 4). However, these techniques also have the foregoing problems. Particularly, the final material is limited to metallic CNTs, and the collection rate is low.

Other methods includes a method in which a mixture of semiconducting CNTs and metallic CNTs is dispersed in a liquid to selectively bind the metallic CNTs to particles, and in which the metallic CNTs attached to the particles are removed to separate the semiconducting CNTs (Patent Document 1), a method in which CNTs treated with a nitronium ion-containing solution are filtered and heat treated to remove the metallic CNTs contained in the CNTs and to obtain semiconducting CNTs (Patent Document 2), a method using sulfuric acid and nitric acid (Patent Document 3), and a method in which CNTs are selectively separated by migration under applied electric field to obtain semiconducting CNTs confined within a narrow electric conductivity range (Patent Document 4).

These techniques also have the foregoing problems. Particularly, the resulting final material is limited to semiconducting CNTs, and the collection rate is low.

There is also a method in which CNTs dispersed with surfactants are separated into metallic CNTs and semiconducting CNTs by density-gradient ultracentrifugal separation (Non-Patent Document 5). This technique is also problematic, because the method uses a very expensive ultracentrifugal separator, and requires a long time for the ultracentrifugal separation procedure. Further, because the ultracentrifugal separator can only be increased to a certain size, more than one ultracentrifugal separator needs to be installed in parallel, and accordingly automation and other processes are difficult.

In another method, separation is achieved by ion-exchange chromatography using a CNT-nucleic acid complex of CNTs attached to nucleic acid molecules (Patent Document 5). A problem of this method, however, is that it requires an expensive synthetic DNA, and that the collection rate and purity are poor because of the moderate separation accuracy.

Further, there is a report directed to separating metallic CNTs and semiconducting CNTs under electric field after causing protonation in different extents for different CNTs by adjusting the pH or ion strength of a CNT solution prepared by dispersing the CNTs with a surfactant (Patent Document 6). However, in this method, a pretreatment step needs to be performed before separation with the use of a strong acid for the pH and ion-strength adjustments of a suspended nanotube mixture. The method thus inevitably involves strict step control, and does not successfully separate metallic CNTs and semiconducting CNTs (Patent Document 6, Example 4).

As described above, all of the conventional methods are insufficient for overcoming the foregoing problems, and there is a need for developing a method based on new ideas whereby metallic CNTs and semiconducting CNTs can be separated from CNTs.

The present inventors have worked on a novel method that differs from any of the conventional methods for separating metallic CNTs and semiconducting CNTs, and completed the inventions below (Patent Documents 7 to 9, and Non-Patent Documents 6 to 8). These inventions all use gels, and desirable separation was confirmed particularly when an agarose gel was used. It was found for the first time that separation of metallic and semiconducting CNTs is possible by agarose gel electrophoresis that uses a solution of CNTs dispersed in a surfactant (Patent Document 7, Non-Patent Document 6). The present inventors also invented a high-yield separation method whereby nearly all CNTs are separated into metallic CNTs and semiconducting CNTs by the electrophoresis of CNTs not in the solution state but in the solidified state in a gel (CNT-containing gel) (Patent Document 8, Non-Patent Document 6). It was also found that the separation using the CNT-containing gel is also possible by applying physical means such as centrifugation, freezing-thawing-squeezing, diffusion, and permeation, instead of using electrical means such as electrophoresis (Patent Document 9, Non-Patent Document 7). This technique allows CNTs to be inexpensively separated in larger quantities and more easily than the techniques that use electrophoresis. In all of the techniques above, separation is achieved by the selective adsorption of the semiconducting CNTs to the gel, and requires dissolving the gel for the collection of the semiconducting CNTs adsorbed to the gel. The present inventors have developed a technique that uses an appropriate eluant for the CNT collection, without dissolving the gel (Non-Patent Document 8). Particularly, the continuous separation method that takes advantage of the adsorption and desorption based on the chromatography technique enables the adsorbed CNTs to be collected in the solution state, and the gel to be directly reused. Further, the technique is highly desirable, because it allows the separation to be automated, and improves the purity of the separated CNTs. However, while the gel can be repeatedly used in this separation method, fast separation requires increasing the surface area with the use of fine gel particles, and using spherical and uniform gel beads to provide space between the gel particles for the passage of the solution. Such fine gel beads of a uniform shape are often expensive, and alternative materials are strongly needed.

CITATION LIST

Patent Documents

Patent Document 1: JP-A-2007-31238
Patent Document 2: JP-A-2005-325020
Patent Document 3: JP-A-2005-194180
Patent Document 4: JP-A-2005-104750
Patent Document 5: JP-A-2006-512276
Patent Document 6: JP-A-2005-527455
Patent Document 7: JP-A-2008-285386
Patent Document 8: JP-A-2008-285387
Patent Document 9: WO/2009/075293

Non-Patent Documents

Non-Patent Document 1: Advanced Materials 18, (2006) 1468-1470
Non-Patent Document 2: J. Am. Chem. Soc. 127, (2005) 10287-10290
Non-Patent Document 3: J. Am. Chem. Soc. 128, (2006) 12239-12242
Non-Patent Document 4: J. Phys. Chem. B 110, (2006) 25-29
Non-Patent Document 5: Nature Nanotechnology 1, (2006) 60-65
Non-Patent Document 6: Appl. Phys. Express 1, (2008) 114001-1-3
Non-Patent Document 7: Nano Letters 9, (2009) 1497-1500
Non-Patent Document 8: Appl. Phys. Express 2, (2009) 125002-1-3

DISCLOSURE OF INVENTION

Problems that the Invention is to Solve

As described above, the present inventors developed the techniques that use gels for the separation of metallic CNTs and semiconducting CNTs. While these techniques are far superior to conventional techniques in term of convenience, yield, purity, cost, and mass processing, there is still a demand for further reducing the separation cost. The present invention has been completed under these circumstances, and it is an object of the present invention to provide a technical means for easily separating metallic CNTs and semiconducting CNTs, whereby an inexpensive agarose or agar powder is directly used instead of the expensive gel beads to selectively adsorb semiconducting CNTs to the powder while leaving the metallic CNTs in a solution. Specifically, the present invention provides a method and a material for easily separating CNTs with inexpensive equipment and in simple steps, whereby the metallic CNTs and the semiconducting CNTs can be efficiently separated and purified in large quantities in a short time period from CNTs containing these carbon nanotubes, and whereby the metallic CNTs and the semiconducting CNTs can be separated at low cost. The invention also provides a separation vessel for CNT separation.

Means for Solving the Problems

The present inventors conducted a series of studies to solve the foregoing problems, and found that metallic CNTs and semiconducting CNTs can be separated by directly charging agarose or agar not in a gel form but as a powder into a separation vessel to separate the CNTs in the manner of chromatography. A carbon nanotube dispersion containing semiconducting carbon nanotubes and metallic carbon nanotubes is added to a separation material formed of an agar powder or an agarose powder, and the separation material is acted upon by a separation liquid to elute the metallic carbon nanotubes unabsorbed to the separation material and separate the metallic carbon nanotubes from the semiconducting carbon nanotubes adsorbed to the separation material. The separation material is then acted upon by an eluant to elute the semiconducting carbon nanotubes from the separation material (FIG. 1). Conventional separation techniques use agarose or agar in a gel form, and accordingly require the procedure of heating, dissolving, and gelling an aqueous solution containing agarose or other material, or purchasing expensive molded gel beads. The present invention represents a very unique technique, because it uses the raw material agarose or agar powder of the gel, either directly or in suspension form (FIG. 2). The material used may be a powder of extracts from seaweeds, other than agarose or agar. The present invention finds ways for novel applications of agar and agarose.

The present invention has been completed based on these novel findings.

Specifically, this application provides the following invention.

<1> A method for separating metallic carbon nanotubes and semiconducting carbon nanotubes,
the method comprising:
adding a carbon nanotube dispersion containing the semiconducting carbon nanotubes and the metallic carbon nanotubes to a separation material formed of an agar powder or an agarose powder;
causing a separation liquid to act on the separation material to elute the metallic carbon nanotubes unadsorbed to the separation material and separate the metallic carbon nanotubes from the semiconducting carbon nanotubes adsorbed to the separation material; and
causing an eluant to act on the separation material to elute the semiconducting carbon nanotubes from the separation material.

<2> The method for separating metallic carbon nanotubes and semiconducting carbon nanotubes according to <1>, wherein the agar powder or the agarose powder forming the separation material is suspended beforehand in an aqueous medium.

<3> A metallic carbon nanotubes and semiconducting carbon nanotubes separation material for use in the method for separating metallic carbon nanotubes and semiconducting carbon nanotubes of <1> or <2>, characterized in that the separation material is formed of an agar powder or an agarose powder.

<4> The metallic carbon nanotubes and semiconducting carbon nanotubes separation material according to <3>, wherein the agar powder or the agarose powder has a swollen layer formed on a powder surface by absorbing an aqueous medium.

<5> A metallic carbon nanotubes and semiconducting carbon nanotubes separation vessel for use in the method for separating metallic carbon nanotubes and semiconducting carbon nanotubes of <1> or <2>, characterized in that the separation vessel has a tubular shape, and comprises an inlet at one end and an elution opening at the other end, the separation vessel being charged with a separation material between the inlet and the elution opening, the separation material being formed of an agar powder or an agarose powder.

<6> The separation vessel according to <5>, wherein a filter is disposed between the inlet and the separation material and/or between the elution opening and the separation material.

Advantage of the Invention

The present invention enables separation of metallic CNTs and semiconducting CNTs with an agarose powder or an even less expensive agar powder, without using the expensive gel beads or without the procedure of preparing a gel suited for the separation, at the level comparable to that possible with the gel.

MODE FOR CARRYING OUT THE INVENTION

Figure 1:
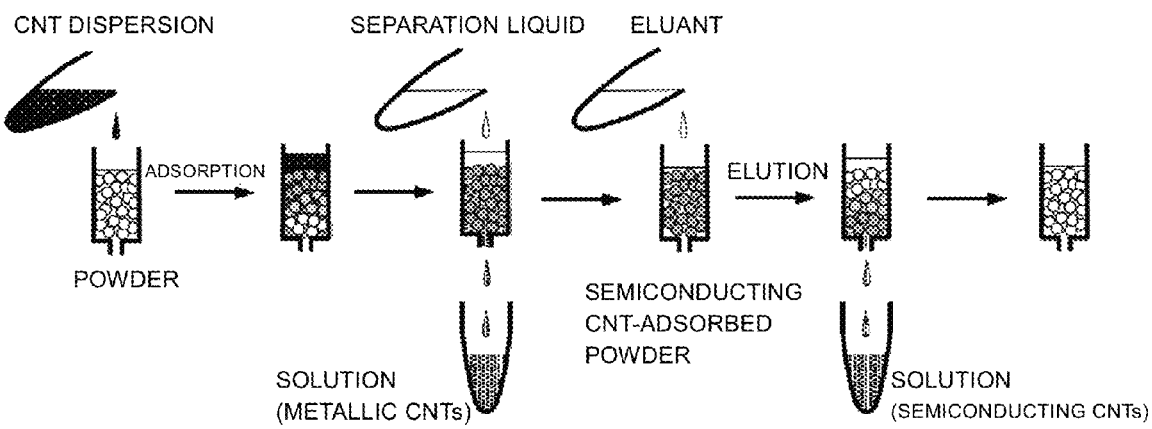
FIG. 1 is a diagram representing separation of metallic CNTs and semiconducting CNTs with a separation vessel charged with a powder.
Figure 2:
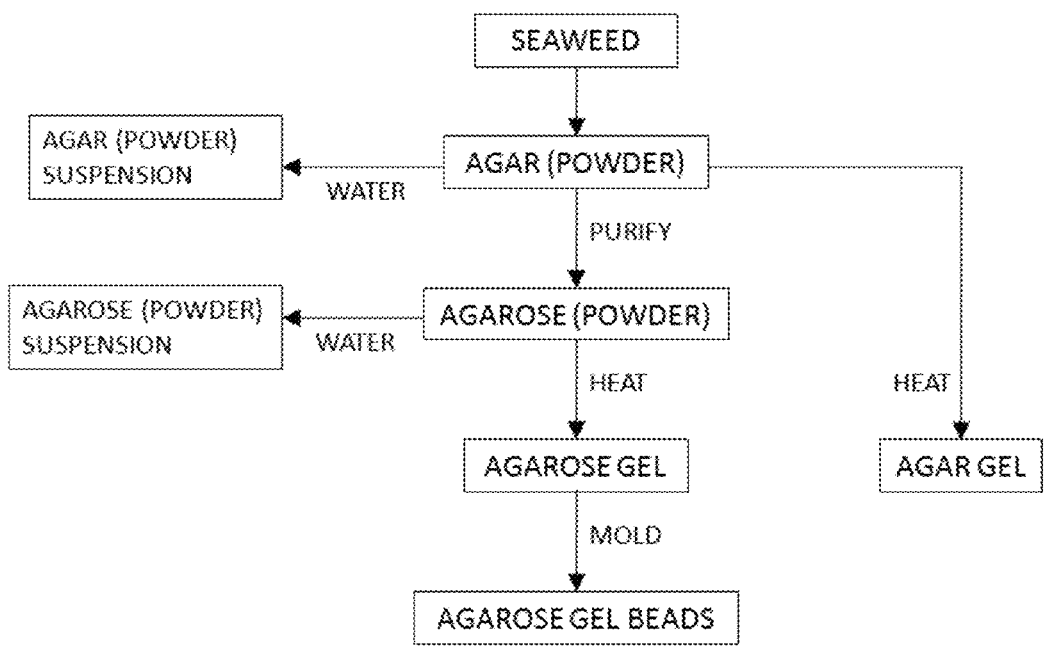
FIG. 2 is a diagram representing a method of preparing a separation material.

The present invention is directed to a method for separating metallic CNTs and semiconducting CNTs from a mixture of metallic CNTs and semiconducting CNTs (hereinafter, also referred to simply as "CNTs").

The CNTs separated are not limited by the methods of production, the shape (including diameter and length), and the structure (for example, may be a single wall or a double wall). Any CNTs can be the target of the separation into metallic CNTs and semiconducting CNTs by the present invention.

Generally, a CNT structure is primarily defined by the chiral indices represented by a set of two integers (n, m). The metallic CNTs and semiconducting CNTs as used in the present invention are distinguished by their electrical properties. The metallic CNTs are defined as having a chiral index n−m=(multiples of three), and the semiconducting CNTs as having a chiral index other than n−m=multiples of three (Non-Patent Document 6: Riichiro Saito, Hisanori Shinohara, Basics and Applications of Carbon Nanotubes, Baifukan, pp. 13 to 22).

Preparation of CNT Dispersion

Synthesized CNTs typically exist as bundles of several ten to several hundred metallic CNTs and semiconducting CNTs. For the separation of the metallic CNTs and the semiconducting CNTs, it is important that the CNTs be stabilized in advance for extended time periods by being dispersed and solubilized in the form of individual, isolated CNTs.

To this end, the mixture of metallic CNTs and semiconducting CNTs is added to a solution containing a surfactant added as a dispersant, and the CNTs are dispersed and isolated by sufficient sonication or the like. The liquid after the dispersion process contains the dispersed and isolated CNTs, CNT bundles that could not be dispersed and isolated, amorphous carbon as a synthesis by-product, and a metal catalyst.

The liquid after the dispersion process is centrifuged with a centrifuge. The centrifugation settles the CNT bundles, the amorphous carbon, and the metal catalyst, whereas the isolated CNTs forming micelles with the surfactant can be collected with the supernatant. The supernatant can then be used as a sample (CNT dispersion) for the separation of metallic CNTs and semiconducting CNTs.

Water is most preferred as the solvent used to prepare the CNT dispersion. Water is thus used to prepare the CNT dispersion.

Any of anionic surfactants, cationic surfactants, ampholytic surfactants, and non-ionic surfactants may be used as the surfactant.

Preferred examples of the anionic surfactants include alkylsulfuric acid surfactants of 10 to 14 carbon atoms (such as alkyl sulfates), dodecanesulfonic acid, dodecanoylsarcosine, dodecanoic acid, cholic acid, and salts thereof, for example, such as sodium salts. Examples of the alkyl sulfates include sodium dodecylsulfate, sodium decylsulfate, and sodium tetradecylsulfate. Preferred examples of the ampholytic surfactants include n-dodecylphosphocholine. These surfactants may be used as a mixture, or with other surfactants.

Aside from the anionic surfactants, the cationic surfactants, the ampholytic surfactants, and the non-ionic surfactants, the surfactants used with the foregoing surfactants may be dispersants such as polymer, DNA, and protein. The concentration of the surfactant and other dispersants may be typically 0.01% to 25% (final concentration), though the concentration depends on such factors as the type and concentration of the CNTs used, and the type of the dispersant used.

In this way, the CNT concentration in the dispersion can be brought to 1 μg/ml to 10 mg/ml, preferably 0.1 mg/ml to 1 mg/ml.

Separation Method

The method for separating metallic CNTs and semiconducting CNTs according to the present invention includes passing the CNT dispersion obtained as above through a separation vessel charged with a separation material powder to selectively adsorb the semiconducting CNTs to the powder and to collect the metallic CNTs as an unadsorbed fraction, and desorbing and collecting the adsorbed semiconducting CNTs by using an eluant (FIG. 1).

Separation Material

Figure 3:
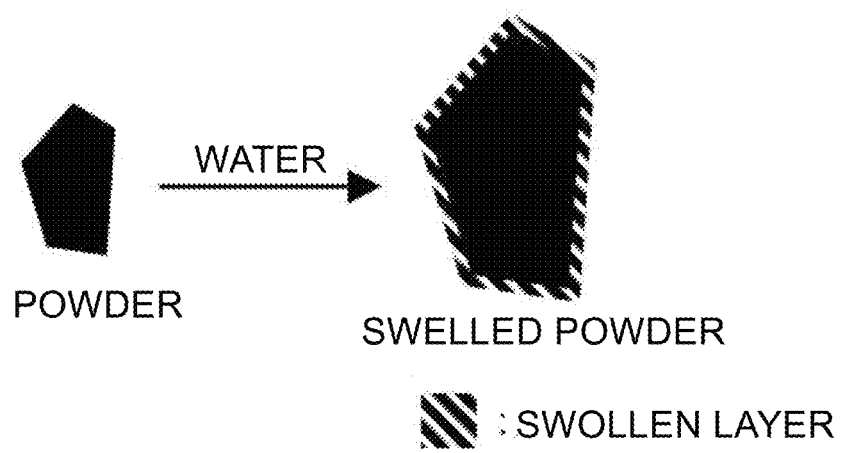
FIG. 3 is a schematic view of an agar powder or an agarose powder.

The powder used for the separation is a powder of, for example, agarose and agar (polysaccharides contained in algae such as members of the genus Gelidium, containing agarose and agaropectin as primary components). The powder has a particle diameter of preferably 1 μm to 500 μm. When being charged into the separation vessel (described later), it is preferable that the agarose powder or agar powder be suspended in an aqueous medium such as water, and charged into the vessel in the form of a suspension. For example, an appropriate amount of water is added to 5 g of an agar powder to prepare an agar powder suspension. The agar powder in the suspension absorbs water, and swells to increase its weight by about eight-fold. The swelled powder has a thin swollen layer on the surface (FIG. 3). In the CNT separation using a powder with such a swollen layer, it is believed that the CNTs do not enter the powder, and are adsorbed at the swollen layer portion. In fact, it is known that CNTs enter the gel in the CNT separation using an agarose gel, and accumulate and remain inside the gel after the separation is repeated with the same gel. On the other hand, in the separation using the powder having the swollen layer, hardly any CNTs remain in the powder even after repeated separation, most likely because of no entry of the CNTs into the powder. The separation using the powder can be said as being more advantageous than the separation using the gel, because it is simpler and less expensive, and is highly suited for repeated use.

The aqueous medium used to suspend the agarose powder or agar powder is a medium containing 50 weight % to 100 weight % of water and 0 weight % to 50 weight % of a water-soluble organic solvent. The water-soluble organic solvent may be an alcohol such as methanol and ethanol. Other examples include acetone, methyl ethyl ketone, and tetrahydrofuran. The amount of the aqueous medium added to the agarose powder or agar powder is not particularly limited, as long as the agarose powder or agar powder can be suspended.

Separation Vessel

Figure 4:
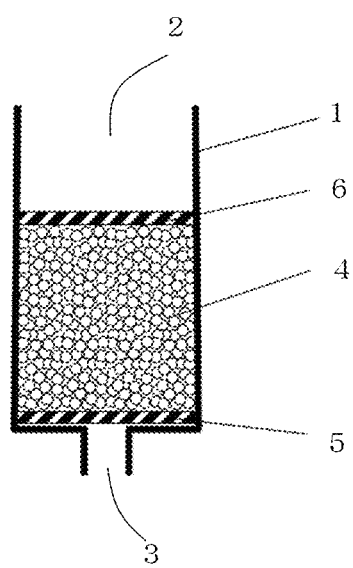
FIG. 4 is a schematic view of a separation vessel.

As illustrated in FIG. 4, a separation vessel 1 used for the CNT separation has a tubular shape, and includes an inlet 2 at one end, an elution opening 3 at the other end. Further, the separation vessel 1 is charged with a separation material 4 between the inlet 2 and the elution opening 3, the separation material 4 being formed of an agar powder or an agarose powder. For example, a commercially available column or a cylindrical vessel may be used as the separation vessel 1. A filter 5 may be installed at the bottom portion of the column or cylindrical vessel, specifically between the elution opening 3 and the separation material 4, in order to prevent the powder from leaking out of the vessel. A powder suspension, prepared in advance, is poured into the vessel to charge the powder. A filter 6 may be installed at the top portion of the vessel, specifically between the inlet 2 and the separation material 4, in order to prevent the powder from being disturbed in the powder-charged vessel in response to addition of the CNT dispersion, the separation liquid, and the eluant (described later). Here, even though the vessel has been described as being used with the top open, it is also possible to use a closed vessel, such as those producing hardly any liquid pool at the top of the charged powder.

Separation

Prior to the separation, the powder or the powder suspension in the separation vessel is preferably equilibrated with an aqueous solution (separation liquid) containing a separation surfactant. The separation surfactant may be, among the surfactants described above, of the same type used to disperse the CNTs, or may be a different surfactant, or a mixture of these. The CNT dispersion is added to the equilibrated separation vessel. This is followed by addition of the separation liquid to separate the semiconducting CNTs adsorbed to the powder and held in the separation vessel from the metallic CNTs unadsorbed to the powder and pass through the separation vessel. The semiconducting CNTs adsorbed to the powder are eluted by adding an appropriate eluant to the separation vessel (FIG. 1).

The eluant used for the desorption of the semiconducting CNTs adsorbed to the powder in this method may be a solution containing a different type of surfactant from the surfactant contained in the separation liquid. Specific examples of the surfactant contained in the eluant include sodium deoxycholate, sodium cholate, sodium dodecylbenzene sulfonate, Tween-20, and Triton X-100. A solution containing the same type of surfactant as that used for the separation also may be used as the eluant. For example, SDS may be used. In this case, it is desirable that the surfactant contained in the eluant used for the separation has a higher concentration than the surfactant used for the separation.

Ultraviolet-visible-nearinfrared absorption spectral measurement is used to estimate the proportions of the metallic CNTs and semiconducting CNTs.

Figure 10:
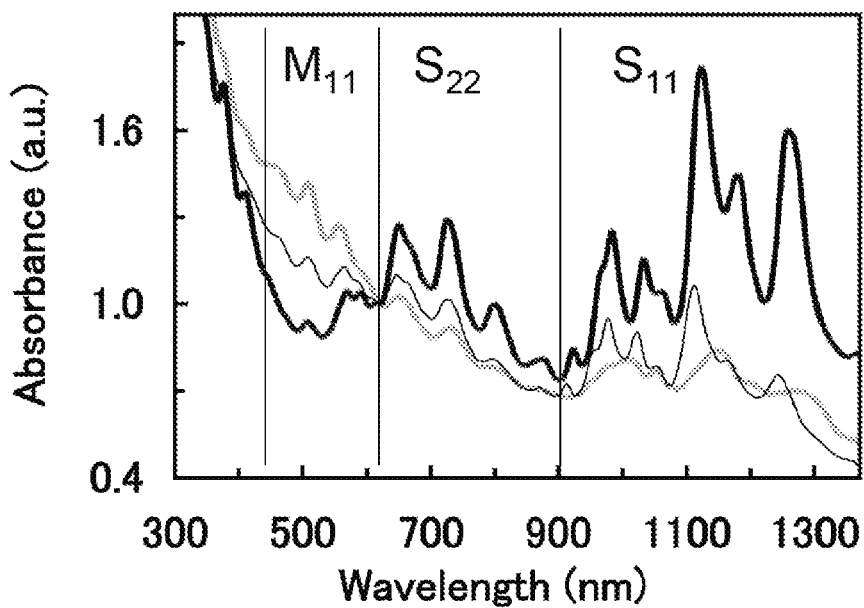
FIG. 10 is a diagram representing photoabsorption spectra of CNTs (Example 3; Hipco-CNTs) separated with an agarose powder; narrow line, before separation; grey thick line, unadsorbed fraction; black thick line, adsorbed fraction.

As an example, this is described by using the result from the CNTs obtained by HiPco synthesis (HiPco-CNTs, diameter 1.0±0.3 nm) (FIG. 10). The absorption wavelength band (about 450 to 620 nm) called $M_{11}$ is of the metallic CNTs. The three absorption wavelength bands $S_{11}$ (about 900 nm and higher), $S_{22}$ (about 620 to 900 nm), and $S_{33}$ (about 450 nm and lower) result from the semiconducting CNTs. Here, the proportions of the metallic CNTs and the semiconducting CNTs are estimated from the proportions of the $M_{11}$ and $S_{22}$ peak sizes. The absorption wavelength bands ($M_{11}$, $S_{11}$, $S_{22}$, $S_{33}$) vary according to the average diameter of the measured CNTs. The absorption wavelength bands shift toward the shorter wavelength side with decreasing average diameters, and toward the longer wavelength side with increasing average diameters.

EXAMPLES

The present invention is described below in more detail using examples. It should be noted that the present invention is not limited by the following examples.

Example 1

In this example, an agarose powder or an agar powder was charged into a separation vessel to separate the CNTs synthesized by using the ARC method. Comparisons with an example in which agarose gel beads were used in place of the powder were also made.

Preparation of CNT Dispersion

A 1% sodium dodecyl sulfate (SDS) aqueous solution (100 ml) was added to 100 mg of ARC-CNTs (Meijo Nano Carbon; APJ; CNTs synthesized by chemical vapor deposition; diameter 1.4±0.1 nm), and the CNTs were thoroughly suspended in the solution. The solution was sonicated at 30% output for 2 hours while being cooled in cold water, using a tip-type ultrasonic homogenizer (Sonifier; Branson; tip diameter 0.5 inches).

The dispersion resulting from the sonication was subjected to ultracentrifugal separation (505,000×g, 1 hour) to collect 80% of the supernatant. The solution was then used as a CNT dispersion.

Preparation of Separation Vessel, and Separation

A suspension prepared by adding water to an agarose powder (Agarose H14; Takara Bio; 5014) was charged into a plastic vessel (charged volume was about 4 ml). After equilibrating the separation vessel with a 1% SDS aqueous solution, 0.2 ml of the CNT dispersion was added to the separation vessel. This was followed by addition of a 1% SDS aqueous solution to collect the unadsorbed fraction. Then, a 1% sodium deoxycholate (DOC) aqueous solution was added to collect the eluted CNTs.

Figure 5:
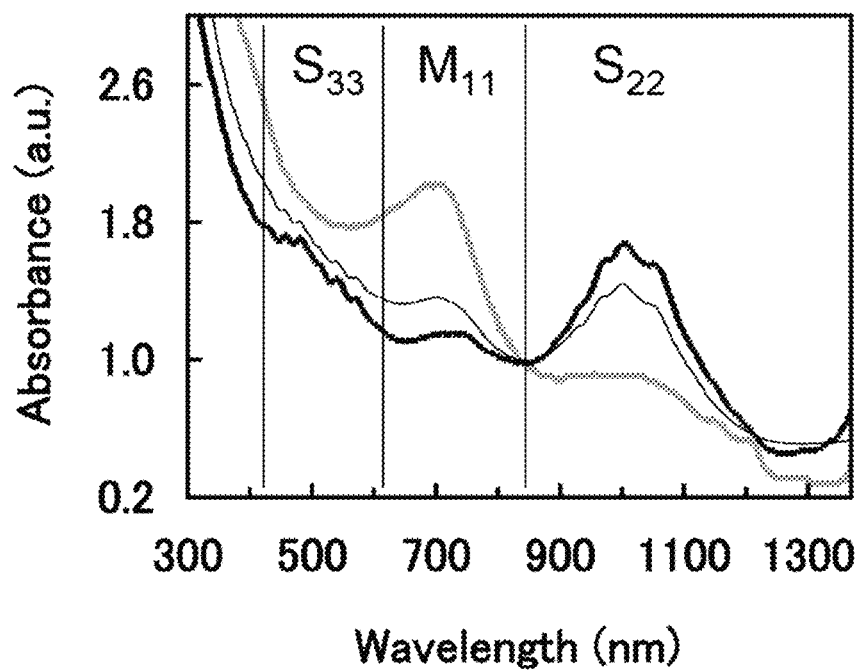
FIG. 5 is a diagram representing photoabsorption spectra of CNTs (Example 1; Arc-CNTs) separated with an agarose powder; narrow line, before separation; grey thick line, unadsorbed fraction; black thick line, adsorbed fraction.
Figure 6:
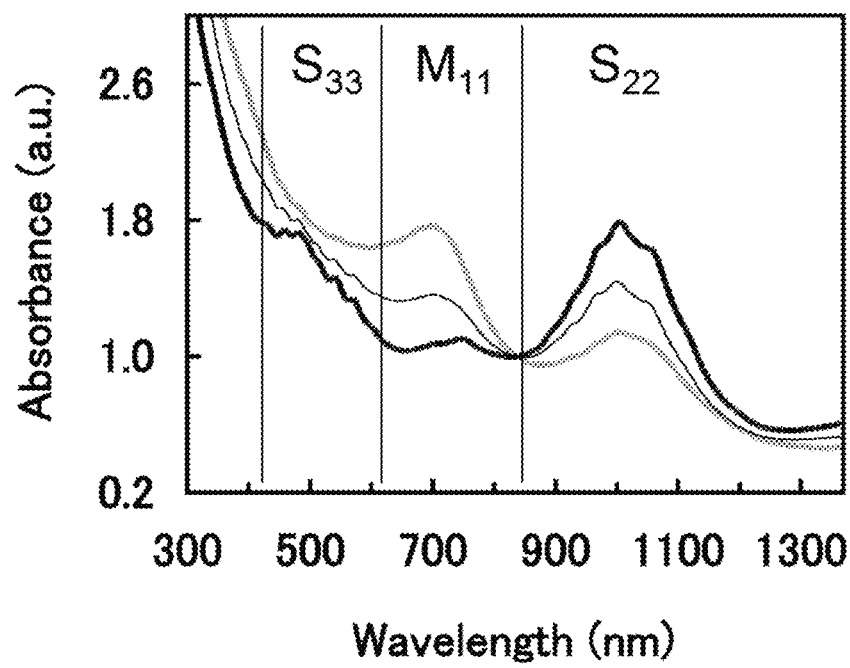
FIG. 6 is a diagram representing photoabsorption spectra of CNTs (Example 1; Arc-CNTs) separated with an agar powder; narrow line, before separation; grey thick line, unadsorbed fraction; black thick line, adsorbed fraction.
Figure 7:
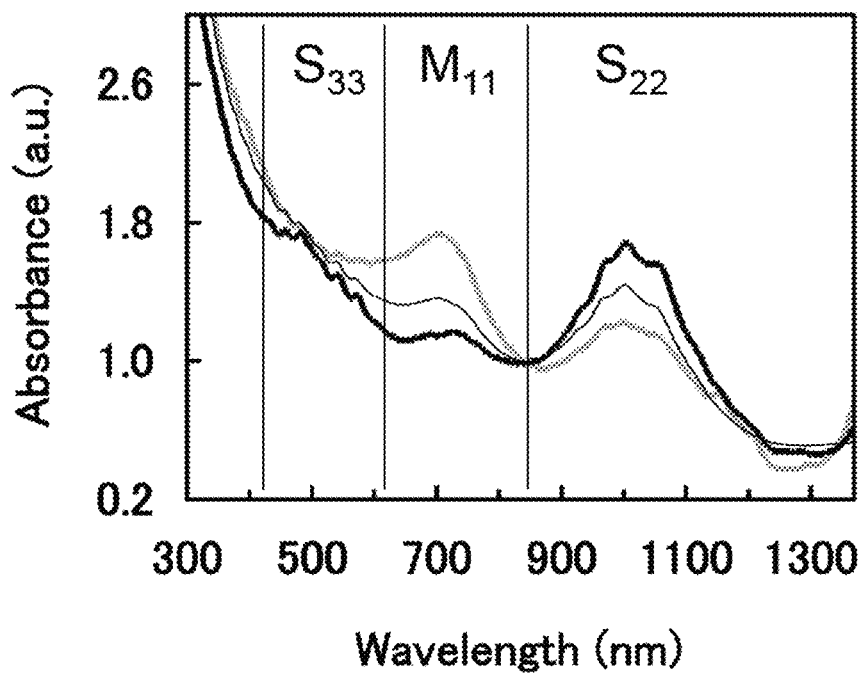
FIG. 7 is a diagram representing photoabsorption spectra of CNTs (Example 1; Arc-CNTs) separated with agarose gel beads; narrow line, before separation; grey thick line, unadsorbed fraction; black thick line, adsorbed fraction (comparative example).

FIG. 5 represents the result of the photoabsorption spectral measurement of each fraction. FIG. 6 represents the result of the same experiment conducted by using an agar powder (for plant media; Wako Pure Chemical Industries, Ltd.; 016-11875) instead of the agarose powder. FIG. 7 represents the result from using agarose gel beads (Sepharose 2B; GE healthcare). In the figures, narrow line represents the spectrum before the separation, and grey thick line and black thick line represent the spectra of the unadsorbed fraction and the 1% DOC aqueous solution eluted fraction, respectively.

In all cases, the proportion of $M_{11}$ of the metallic CNTs in the unadsorbed fraction spectrum after the separation was prominently higher than the proportions of the semiconducting CNT absorption ($S_{22}$) and the metallic CNT absorption ($M_{11}$) in the CNT dispersion spectra before the separation, confirming the separation of the metallic CNTs. Conversely, the proportion of the semiconducting CNT absorption ($S_{22}$) was prominently higher in the eluted fraction, confirming the separation of the semiconducting CNTs. The purity of the metallic CNTs and the semiconducting CNTs separated with the agarose powder and the agar powder was almost no different from the result from using the agarose gel beads, suggesting that desirable separation is possible without the gelling or bead molding procedure. Particularly, the agar powder had sufficient separating ability, even though the agar powder was unpurified, and much less expensive than the purified agarose.

This example clearly demonstrate that separation of metallic CNTs and semiconducting CNTs is possible by the selective adsorption of the semiconducting CNTs to the powder and the elution of the semiconducting CNTs with the use of an agarose powder or an agar powder.

Example 2

Figure 8:
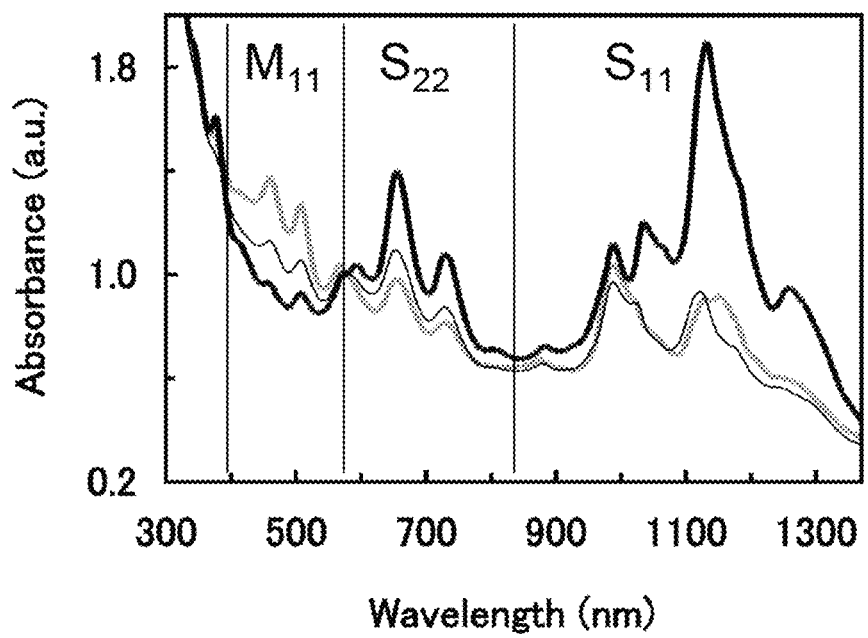
FIG. 8 is a diagram representing photoabsorption spectra of CNTs (Example 2; CoMocat-CNTs) separated with an agarose powder; narrow line, before separation; grey thick line, unadsorbed fraction; black thick line, adsorbed fraction.
Figure 9:
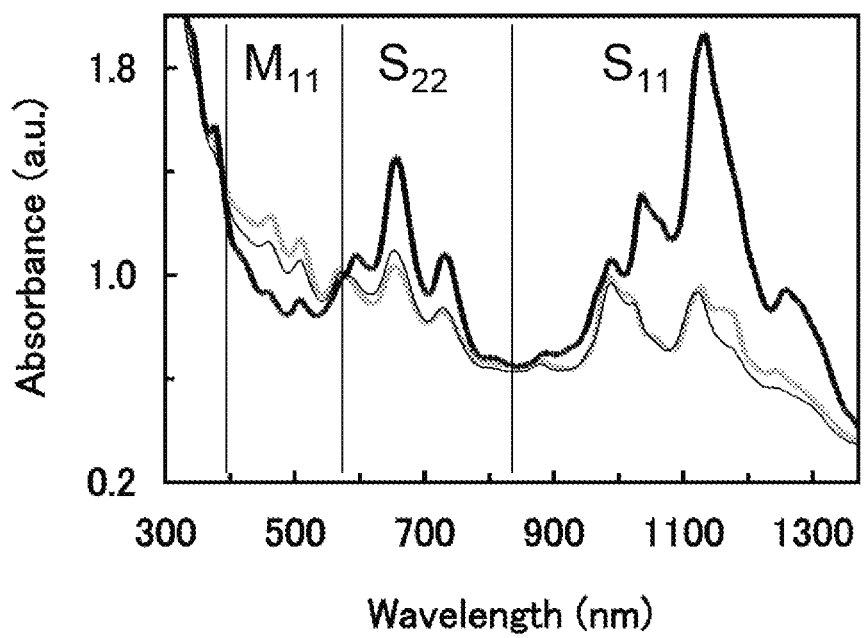
FIG. 9 is a diagram representing photoabsorption spectra of CNTs (Example 2; CoMocat-CNTs) separated with an agar powder; narrow line, before separation; grey thick line, unadsorbed fraction; black thick line, adsorbed fraction.

Experiments were conducted in the same manner as in Example 1 by using different CNTs (CoMoCAT-CNTs; SG76; Sigma Aldrich; diameter 0.9±0.2 nm). FIG. 8 represents the result from using an agarose powder. FIG. 9 represents the result from using an agar powder. In the figures, narrow line represents the spectrum before the separation, and grey thick line and black thick line represent the spectra of the unadsorbed fraction and the 1% DOC aqueous solution eluted fraction, respectively.

Also in this case, the metallic CNTs and the semiconducting CNTs were separated in the unadsorbed fraction and the eluted fraction, respectively.

Example 3

Experiments were conducted in the same manner as in Example 1 by using different CNTs (HiPco-CNTs, Unydim; diameter 1.0±0.3 nm). FIG. 10 represents the result from using an agar powder. In the figure, narrow line represents the spectrum before the separation, and grey thick line and black thick line represent the spectra of the unadsorbed fraction and the 1% DOC aqueous solution eluted fraction, respectively.

Also in this case, the metallic CNTs and the semiconducting CNTs were separated in the unadsorbed fraction and the eluted fraction, respectively.

The invention claimed is:

1. A method for separating metallic carbon nanotubes and semiconducting carbon nanotubes, the method comprising:
   adding a carbon nanotube dispersion containing the semiconducting carbon nanotubes and the metallic carbon nanotubes to a separation material formed of an agar powder or an agarose powder;
   causing a separation liquid to act on the separation material to elute the metallic carbon nanotubes unadsorbed to the separation material and separate the metallic carbon nanotubes from the semiconducting carbon nanotubes adsorbed to the separation material; and
   causing an eluant to act on the separation material to elute the semiconducting carbon nanotubes from the separation material.

2. The method for separating metallic carbon nanotubes and semiconducting carbon nanotubes according to claim 1, wherein the agar powder or the agarose powder forming the separation material is swelled by being suspended beforehand in an aqueous medium.

3. The method for separating metallic carbon nanotubes and semiconducting carbon nanotubes according to claim 2, wherein the agar powder or the agarose powder has a swollen layer formed on a powder surface by absorbing the aqueous medium.

4. The method for separating metallic carbon nanotubes and semiconducting carbon nanotubes according to claim 2, which is carried out in a separation vessel,
   wherein the separation vessel has a tubular shape, and comprises an inlet at one end and an elution opening at the other end, and
   wherein the separation vessel is charged with the separation material between the inlet and the elution opening.

5. The method for separating metallic carbon nanotubes and semiconducting carbon nanotubes according to claim 4, wherein a filter is disposed between the inlet and the separation material and/or between the elution opening and the separation material.

6. The method for separating metallic carbon nanotubes and semiconducting carbon nanotubes according to claim 1, wherein the agar powder or the agarose powder has a swollen layer formed on a powder surface by absorbing an aqueous medium.

7. The method for separating metallic carbon nanotubes and semiconducting carbon nanotubes according to claim 1, which is carried out in a separation vessel,
   wherein the separation vessel has a tubular shape, and comprises an inlet at one end and an elution opening at the other end, and
   wherein the separation vessel is charged with the separation material between the inlet and the elution opening.

8. The method for separating metallic carbon nanotubes and semiconducting carbon nanotubes according to claim 7, wherein a filter is disposed between the inlet and the separation material and/or between the elution opening and the separation material.

* * * * *